United States Patent Office.

CHARLES U. SHEPARD, JR., OF CHARLESTON, SOUTH CAROLINA, ASSIGNOR TO GEORGE S. SCOTT, OF NEW YORK, N. Y.

Letters Patent No. 100,457, dated March 1, 1870.

IMPROVEMENT IN PREPARING AMMONIATED SULPHURIC ACID FOR THE MANUFACTURE OF FERTILIZERS.

The Schedule referred to in these Letters Patent and making part of the same.

*To all whom it may concern:*

Be it known that I, CHARLES U. SHEPARD, Jr., of the city and county of Charleston, and State of South Carolina, have invented an Improved Process for Preparing Ammoniated Sulphuric Acid for admixture with phosphates in the manufacture of manures, of which the following is a specification.

My invention relates to an improved process for treating the ammoniacal distillate of the ammoniacal water of gas-works with sulphuric acid for admixture with phosphatic material in the manufacture of manure.

I propose to mix quicklime, or other equivalent material, with the ammoniacal water of gas-works, and apply heat thereto for the purpose of liberating the ammonia, which is carried over as a gas and absorbed by sulphuric acid; not, however, for the immediate or ultimate production of a dry salt of ammonia, as I am aware that this is a well-known method of preparing the sulphate and other salts of ammonia, but I limit the absorption to such degree only as, that a portion of the sulphuric acid shall remain uncombined, leaving the product in a fluid state, convenient for shipment. I then pour the liquid onto the phosphatic material, the uncombined sulphuric acid acting upon the phosphatic material, will render it somewhat soluble, and the entire mass will become ammoniated by that portion of ammonia which has been combined with the acid.

The same process may be applied to the combination of ammonia produced by liberation from bone-black, or other ammoniacal material, by familiar processes; the gas thus produced is to be treated in the same manner.

I wish it to be understood that I do not claim the process of treating ammoniacal gas with an acid for the production of salts of ammonia, for this I know is not new; but my process is distinguished from all others of which I have knowledge by this, that I stop the process before a solid salt has been formed, and while a portion of the acid remains uncombined, so that I may economically produce upon the phosphatic material the effect due both to the presence of the acid and also of the ammonia.

What I claim, as my invention, is—

1. The production of ammoniated sulphuric acid, by treating ammoniacal water with lime or other liberating material, or by the liberation of ammonia from bone-black or other ammoniacal matter, and the absorption of such ammoniacal gas or vapor by sulphuric acid, in such proportions as to leave a part of the sulphuric acid uncombined, substantially as set forth.

2. The treatment of phosphatic material with such ammoniated sulphuric acid for the production of an ammoniated super-phosphate, substantially as set forth.

In testimony whereof I have signed my name to this specification in the presence of two subscribing witnesses.

CHARLES U. SHEPARD, JR.

Witnesses:
   D. JENNINGS,
   F. STREET BURDELL.